(12) United States Patent
Vankouwenberg et al.

(10) Patent No.: US 11,650,766 B2
(45) Date of Patent: May 16, 2023

(54) SYSTEM AND METHOD FOR OPTIMIZING A PRINTER SETUP

(71) Applicant: Xerox Corporation, Norwalk, CT (US)

(72) Inventors: David A Vankouwenberg, Avon, NY (US); Martin L Frachioni, Rochester, NY (US); David M Gurak, Webster, NY (US); Christopher Mieney, Lima, NY (US); Stuart A Schweid, Pittsford, NY (US)

(73) Assignee: XEROX CORPORATION, Norwalk, CT (US)

( * ) Notice: Subject to any disclaimer, the term of this patent is extended or adjusted under 35 U.S.C. 154(b) by 0 days.

(21) Appl. No.: 17/503,887

(22) Filed: Oct. 18, 2021

(65) Prior Publication Data

US 2023/0124454 A1    Apr. 20, 2023

(51) Int. Cl.
*G06F 3/12* (2006.01)

(52) U.S. Cl.
CPC .......... *G06F 3/1205* (2013.01); *G06F 3/1204* (2013.01); *G06F 3/1253* (2013.01); *G06F 3/1273* (2013.01)

(58) Field of Classification Search
CPC combination set(s) only.
See application file for complete search history.

(56) References Cited

U.S. PATENT DOCUMENTS

| | | | |
|---|---|---|---|
| 6,198,493 B1* | 3/2001 | Kishimoto | B41J 2/04591 347/171 |
| 2018/0022107 A1* | 1/2018 | Fujiwara | B41J 2/2146 347/14 |
| 2019/0156825 A1* | 5/2019 | Shiga | G10L 15/30 |
| 2020/0142654 A1* | 5/2020 | Imai | G06F 3/1253 |
| 2020/0192609 A1* | 6/2020 | Shinkai | G06N 3/0454 |
| 2021/0152700 A1* | 5/2021 | Matsumura | H04N 1/00403 |
| 2021/0178677 A1* | 6/2021 | Liu | B33Y 30/00 |
| 2022/0118767 A1* | 4/2022 | Wong | B41J 2/17566 |
| 2022/0169045 A1* | 6/2022 | Murata | B41J 11/0095 |

\* cited by examiner

*Primary Examiner* — Helen Zong
(74) *Attorney, Agent, or Firm* — Lippes Mathias LLP

(57) ABSTRACT

An apparatus is disclosed that automatically generates a set of recommended printer settings 300 for a print job 100 submitted to a printer 10. The apparatus comprises at least one processor which executes computer program code from at least one memory, wherein the at least one memory and the computer program code are configured, with the at least one processor, to cause the apparatus at least to: receive a submitted print job for a printer, the submitted print job including content to be printed by the printer and a set of user input printer settings for the printer; analyze the content to be printed by the printer; designate a classification for the submitted print job based on said analysis; obtain historical data from a knowledge database, the historical data being related to prior print jobs run on the printer and indicating printer settings used when running the prior print jobs on the printer; and output a set of recommended printer settings based at least in part on one or more of the received print job, the designated classification and the obtained historical data.

20 Claims, 2 Drawing Sheets

SYSTEM AND METHOD FOR OPTIMIZING A PRINTER SETUP

BACKGROUND

The present specification relates to the printing arts. It finds particular application in connection with digital printers, e.g., such as ink-jet printers, and/or other like devices and accordingly it will be described herein with reference thereto. It is to be appreciated, however, that it also may be employed in connection with other like applications.

Generally, setting up a printer to run in the most efficient and cost-effective manner takes time and experience. The manner in which a printer is setup can significantly affect the cost of running print jobs, particularly in the case of high volume jobs, and if done incorrectly can potentially result in damage to the printer and/or potentially result in costly cleaning and/or other maintenance of the printer being prematurely required.

According, there is described herein an inventive method, device and/or system to address concerns related to the setting-up of a printer to run a print job.

BRIEF DESCRIPTION

This Brief Description is provided to introduce concepts related to the present specification. It is not intended to identify essential features of the claimed subject matter nor is it intended for use in determining or limiting the scope of the claimed subject matter. The exemplary embodiments described below are not intended to be exhaustive or to limit the claims to the precise forms disclosed in the following Detailed Description. Rather, the embodiments are chosen and described so that others skilled in the art may appreciate and understand the principles and practices of the subject matter presented herein.

One embodiment disclosed herein relates to an apparatus that automatically generates a set of recommended printer settings for a print job submitted to a printer. The apparatus comprises at least one processor which executes computer program code from at least one memory, wherein the at least one memory and the computer program code are configured, with the at least one processor, to cause the apparatus at least to: receive a submitted print job for a printer, the submitted print job including content to be printed by the printer and a set of user input printer settings for the printer; analyze the content to be printed by the printer; designate a classification for the submitted print job based on said analysis; obtain historical data from a knowledge database, the historical data being related to prior print jobs run on the printer and indicating printer settings used when running the prior print jobs on the printer; and output a set of recommended printer settings based at least in part on one or more of the received print job, the designated classification and the obtained historical data.

Another embodiment disclosed herein relates to a method for setting up a printer to run a submitted print job thereon. The method comprises: receiving a submitted print job for a printer, the submitted print job including content to be printed by the printer and a set of user input printer settings for the printer; analyzing the content to be printed by the printer; designating a classification for the submitted print job based on said analysis; obtaining historical data from a knowledge database, the historical data being related to prior print jobs run on the printer and indicating printer settings used when running the prior print jobs on the printer; and outputting a set of recommended printer settings based at least in part on one or more of the received print job, the designated classification and the obtained historical data.

Numerous advantages and benefits of the subject matter disclosed herein will become apparent to those of ordinary skill in the art upon reading and understanding the present specification. It is to be understood, however, that the detailed description of the various embodiments and specific examples, while indicating preferred and/or other embodiments, are given by way of illustration and not limitation.

BRIEF DESCRIPTION OF THE DRAWINGS

The following Detailed Description makes reference to the figures in the accompanying drawings. However, the inventive subject matter disclosed herein may take form in various components and arrangements of components, and in various steps and arrangements of steps. The drawings are only for purposes of illustrating exemplary and/or preferred embodiments and are not to be construed as limiting. Further, it is to be appreciated that the drawings may not be to scale.

DETAILED DESCRIPTION

Figure 1:
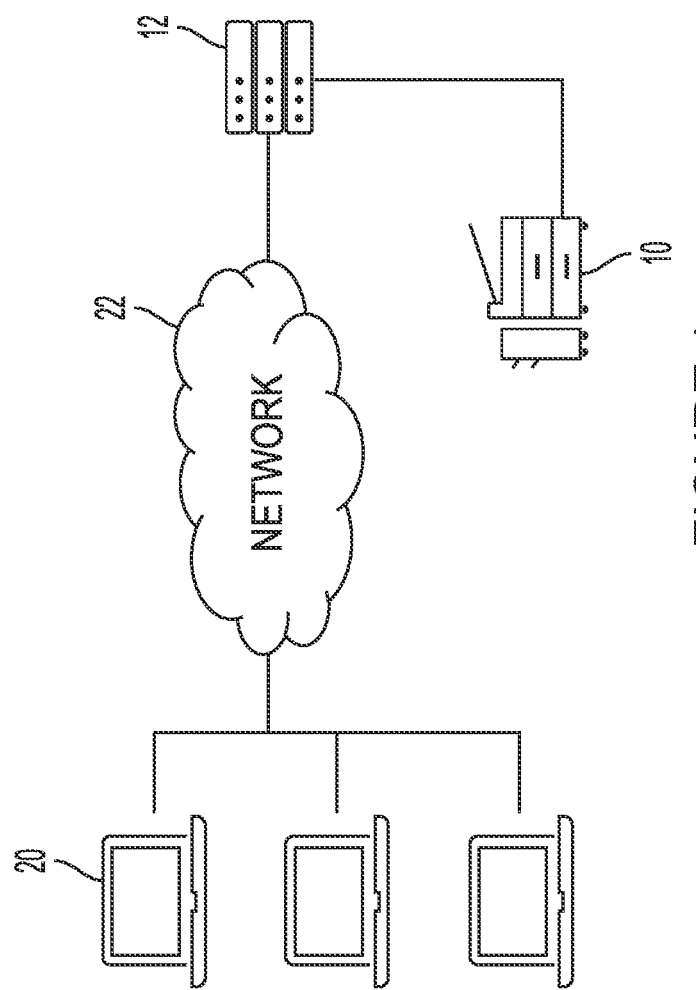
FIG. 1 is a diagrammatic illustration showing an exemplary network environment suitable for practicing aspects of some embodiments described herein.

For clarity and simplicity, the present specification shall refer to structural and/or functional elements, relevant standards, algorithms and/or protocols, and other components, methods and/or processes that are commonly known in the art without further detailed explanation as to their configuration or operation except to the extent they have been modified or altered in accordance with and/or to accommodate the preferred and/or other embodiment(s) presented herein. Moreover, the apparatuses and methods disclosed in the present specification are described in detail by way of examples and with reference to the figures. Unless otherwise specified, like numbers in the figures indicate references to the same, similar or corresponding elements throughout the figures. It will be appreciated that modifications to disclosed and described examples, arrangements, configurations, components, elements, apparatuses, methods, materials, etc. can be made and may be desired for a specific application. In this disclosure, any identification of specific materials, techniques, arrangements, etc. are either related to a specific example presented or are merely a general description of such a material, technique, arrangement, etc. Identifications of specific details or examples are not intended to be, and should not be, construed as mandatory or limiting unless specifically designated as such. Selected examples of apparatuses and methods are hereinafter disclosed and described in detail with reference made to the figures.

In general, embodiments described herein relate to a printer (e.g., a digital ink-jet printer) and/or a method and/or system for setting-up the same. In practice, the printer is suitably provisioned to and/or capable of executing a print job with any number of variable operating parameters. For example: the printer may be equipped to run a print job at any of a number of different printer or machine speeds; the printer may be equipped to run the print job with any of a number of different effective ink drop sizes; the printer may be equipped to run a print job using any of a number of different paper or media types; etc.

Accordingly, for a given print job, there are any number of settings and/or variable parameters for the printer that are set, determined and/or otherwise established prior to running a print job. The established printer settings actually used during the running of a print job can have an effect on the operation of the printer and/or outcome, e.g., the print quality of the printed material resulting from execution of the print job by the printer. For example, some such printer settings may include, without limitation: the effective ink drop size to be employed by the printer for the print job, the printer or machine speed at which a print job is to be run by the printer, the designation of the paper or media type on which the print job is to be printed, etc.

Some embodiments described herein involve the use of data sourced from a plurality of different inputs, data and/or information to automatically generate and/or provide recommended printer settings to a user. In some suitable embodiments, these inputs may include, without limitation, one or more of the following: (i) user input printer settings, (ii) system settings, (iii) historical information about past print jobs, and (iv) input from a job classification engine that analyses the content of a print job. In practice, prior to running a submitted print job on a printer, the user may be provided the option to accept the recommended printer settings and run the submitted print job therewith or alternately to run the submitted print job with the printer settings originally input by the user. In alternative embodiments, the submitted print job may be automatically run with the recommended printer settings, i.e., in effect, over-riding the original user input printer settings.

In some suitable embodiments, the set of recommended printer settings for a particular print job is output to a user. The output set of recommended printer settings may include, without limitation, the effective drop size and machine speed which are recommended to be used by the printer for a submitted print job. In practice, the output set of recommended printer settings may differ from the original user input printer settings.

FIG. 1 illustrates an exemplary network environment suitable for practicing aspects of some embodiments described herein. As shown, a printer, e.g., a digital ink jet printer 10, is provided to execute, carry out and/or run a submitted print job employing an established set of one or more printer settings which define corresponding operating parameters for the printer 10. In one suitable embodiment, the established set of printer settings includes, without limitation: an effective ink drop size, a printer or machine speed at which a job is to be run, and a media type designation.

As shown in FIG. 1, a print server 12 receives and queues submitted print jobs for the printer 10. Submitted print jobs are received by the print server 12 from one or more client devices 20 (e.g., such as tablet, laptop or desktop computers, smart phones or mobile devices, or the like) via a suitable data communication network 22. While shown separately in FIG. 1, in practice, the print server 12 may be integral with the printer 10. Additionally, while FIG. 1 shows the network 22, in some suitable embodiments, the client device 20 may be in direct communication with the printer 10 and/or printer server 12, e.g., via a suitable data communication cable or wireless connection.

Suitably, in some embodiments, a user employs one of the client devices 20 to submit a print job to the printer 10. The submitted print job is received by the print server 12 over the network 22 and is optionally queued until the printer 10 is ready to receive and/or execute the print job. When the printer 10 is ready, the submitted print job is forwarded from the print server 12 to the printer 10 for execution in accordance with an establish set of printer settings.

In some embodiments, when the user enters and/or submits the print job with the client device 20, the user also enters and/or inputs a number of user preferred printer settings which the user initially desires the printer 10 to adopt when executing the submitted print job. The aforementioned user preferred printer settings are also generally referred to herein as the user input printer settings or the original user input printer settings. In practice, the submitted print job from the client device 20 includes the content to be printed, along with the set of user input printer setting.

Figure 2:
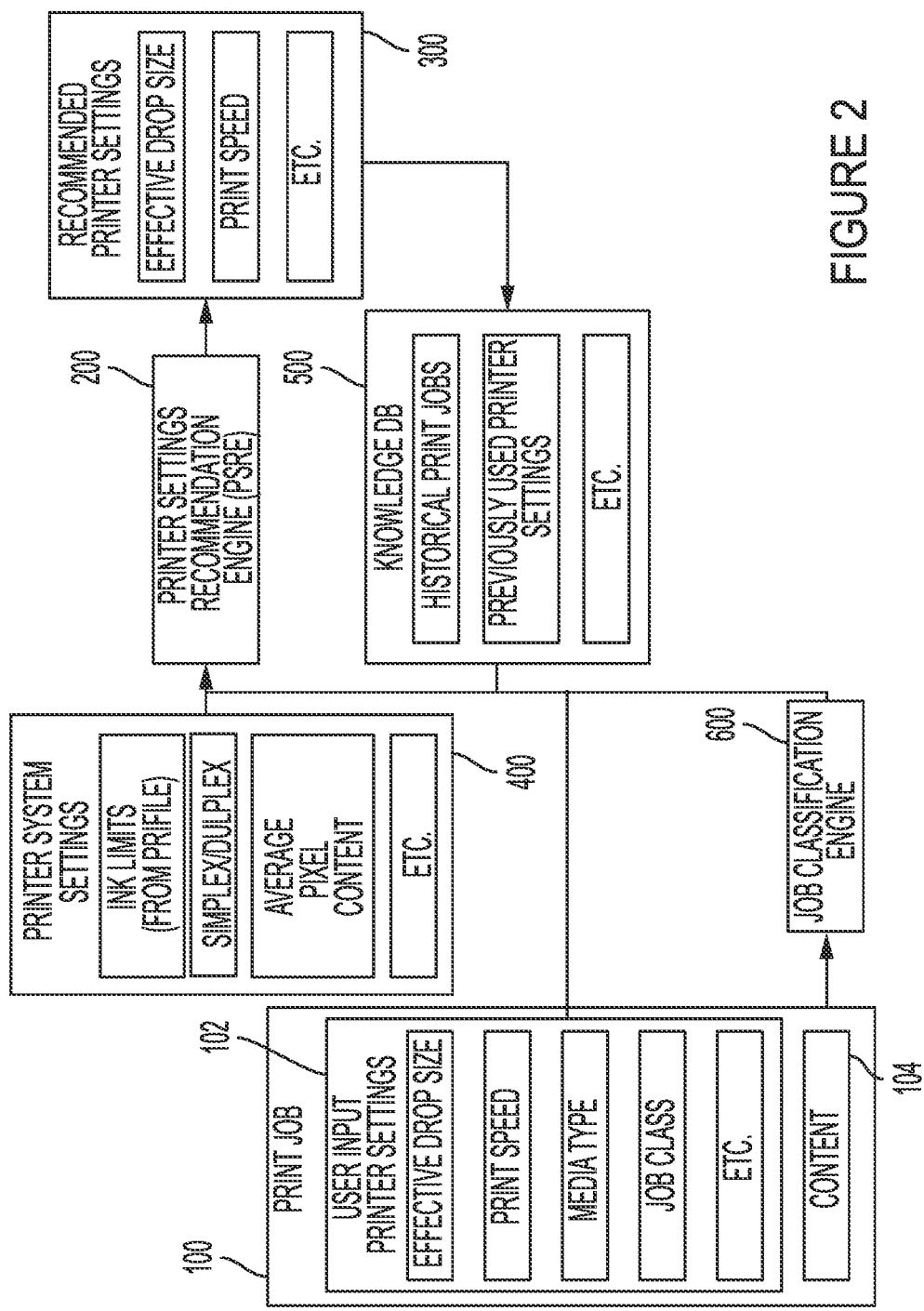
FIG. 2 is a diagrammatic illustration showing a system for generating a recommended set of printer settings in accordance with some aspects of embodiments described herein.

FIG. 2 shows an exemplary print job 100 submitted with a set of user input printer settings 102. As shown in FIG. 2, in the print job 100, that which is to be printed is graphically represented generally as the content 104, i.e., the print data, file or the like. Suitably, the user input printer settings 102 reflect or describe how the user initially thinks the print job 100 should be run by the printer 10, i.e., they are the printer settings the user initially thinks the printer 10 should use when executing the print job 100. Suitably, the user input printer settings 102 are employed to help build an understanding (e.g., by the later described PSRE 200) of the user's desired output print quality level. As shown in FIG. 2, the user input printer settings 102 include, without limitation: an effective ink drop size, a printer speed, a paper or media type designation, an identification of a job classification or job class, etc.

In some suitable embodiments, the user input printer settings 102 are forwarded to a printer settings recommendation engine (PSRE) 200, along with other data and/or information retrieved from other sources and/or input to the PSRE 200. Generally, the PSRE 200 employs the obtained original user input printer settings 102 (along with the other obtained inputs to the PSRE 200) to automatically generate a recommended set of printer settings which the PSRE 200 has determined the printer 10 should employ when running the submitted print job 100. In practice, the recommended set of printer settings 300 is output (e.g., returned and/or otherwise feedback to the client device from which the printer job 100 was submitted) and reflects a set printer settings the PSRE 200 has deemed optimal for execution or running of the submitted print job 100 by the printer 10. That is to say, the PSRE 200 bases the recommended printer settings 300 for a currently submitted print job 100 at least partially on the original user input printer settings 102 provided with and/or accompanying the print job 100.

As shown in FIG. 2, a second set of inputs to the PSRE 200 is pulled and/or otherwise obtained by the PSRE 200 from a number of system settings 400 for the printer 10. For example, these system settings 400 may include, without limitation: information about the amount of ink allowed per color (e.g., which may be defined in a suitable user or printer profile), an average pixel count per page, whether the job is one or two sided, etc. Suitably, the PSRE 200 bases the recommended printer settings 300 for a currently submitted print job 100 at least partially on the obtained system settings 400 for the printer 10. In some alternative embodiments, the printer system setting 400 may in practice by part of and entered along with the user input settings 102.

As further shown in FIG. 2, a third or set of inputs to the PSRE 200 comes from a historical knowledge database (DB) 500 that contains, e.g., the metadata or other like information and/or data associated with all or some number of previously submitted printed jobs. For example, information and/or data about previously run print jobs are recorded and/or maintained in the DB 500, e.g., including, without limitation, the established printer settings actually used for a previously run print job, information about the previous print job itself, etc. In practice, a currently submitted print job 100 is compared by the PSRE 200 to prior print jobs recorded and/or maintained in the DB 500. In essence, from the information and/or data in the historical knowledge DB 500 it can be determined if a print job that is currently being submitted and/or set-up (or a substantially similar print job) has been previously run as well as which printer settings were used when it was run previously. Accordingly, knowing which printer setting were used previously for previously run print jobs informs the decision making process of PSRE 200 about which printer settings to recommend for a currently submitted print job which is the same or substantially similar to the previously run print job. That is to say, the PSRE 200 bases the recommended printer settings 300 for a currently submitted print job 100 at least partially on the actual printer settings historically employed during the running of prior submitted print jobs, as indicated and/or otherwise reflected in the historical knowledge DB 500.

In some suitable embodiments, as shown in FIG. 2, the generated recommended printer settings 300 (along with related information, e.g., whether or not the recommended setting were in fact selected or used for the job; the user input settings 120 for the job; the classification determined for the job by the job classification engine 500, etc.) from run print jobs can be supplied as feed-back to the historical knowledge DB 500. That is to say, the recommended printer setting 300 (and related information) for that job are stored and/or maintained in the historical knowledge DB 500, and thus may be used to inform the PSRE 200 for future jobs.

In some suitable embodiments, the DB 500 stores and maintains historical printer setting knowledge supplied by and/or gleaned from operation of the printer 10 and/or the printer server 12 themselves and/or the client devices 20 submitting print jobs. In some suitable embodiments, the historical knowledge DB 500 is a centrally arranged, cloud-base or other another like network accessible DB which may collect, store and/or maintain historical knowledge about the printer setting used and/or recommended for run print jobs from a fleet of printers, similar to printer 10. In this way, the collective history of printer settings used by the fleet of printers for various print jobs may inform the PSRE 200.

As shown in FIG. 2, a fourth input to the PSRE 200 is a determined classification of the current job, e.g., as automatically or otherwise determined by a print job classification engine 600. Suitably, in practice, the classification engine 600 analyze the content 104 of the submitted print job 100, and based thereon, using a suitable classification algorithm or the like designates the print job 100 as having a determined classification. For example, depending upon the analyzed content 104 of the submitted print job 100 the classification engine 600 may determine and/or designate the submitted print job 100 to be in one of the following determined classes: an ultra-high quality job (e.g., such a photo book), a high-quality job (e.g., such as a magazine), a medium quality job (e.g., such as a trans/promo job) or a low quality job (e.g., such as advertising text). While four classifications have been provided as examples, it is to be appreciated that in practice the job classifications are not limited to these four and more or less or alternate classifications may be defined.

It is to be appreciated that the determined job classification output by the classification engine 600 may not necessarily be the same as the job classification indicated or selected in the user input printer settings 102. Indeed, while a user may select one job classification via the user input printer settings 102, e.g., base on the user's perceived nature of a job or desired output, the classification engine 600 may determine that based on its analysis of the actual content 104 of the submitted print job 100, the job appears more akin to a different classification and/or the output result of running the job on the printer 10 may benefit from being so classified. Accordingly, the PSRE 200 is provided the determined classification from the classification engine 600 so that the PSRE 200 may also take this input into account and generate the recommended printer settings 300 at least partially based on the determined job classification (i.e., as output from the classification engine 600 based on the analyzed actual content 104 of the print job 100), as opposed to merely considering a job classification selected by the user via the user input printer settings 102.

Again, based on one or more of the above-described inputs to the PSRE 200, the PSRE 200 generates and outputs a set of suggested or recommended printer settings 300, e.g., such as effective drop size and machine print speed. In some embodiments, the user may be presented with the opportunity to accept or reject the recommended printer settings 300. In some embodiments, the set of recommended printer settings 300 are an optimized set printer settings for running the submitted print job 100 on the printer 10.

More generally and by way of example, the user and system inputs 102 and 400 are compared by the PSRE 200 to the metadata and/or historical records contained in knowledge DB 500 and the determined job classification obtained from the classification engine 600 to ensure that optimal or otherwise appropriate printer settings have been selected by the user. For example, the metadata or other like information from the knowledge DB 500 may be used to look for historical print jobs that are substantially similar to or the same as the one that the user is currently trying to run or if the job has been run before. The PSRE 200 then suitably identifies mis-matches in printer settings, e.g., where a job is classified as a photobook, has a high average pixel content, and the user selected a coated media, but nevertheless the user selected the largest effective drop size and a high printer operation speed which would not be particularly beneficial for the given print job. Based on other historical jobs that have a similar set of inputs and inferred and/or otherwise determined knowledge of the intended operation of the printer 10, the PSRE 200 in this case would suggest or recommend a smaller effective drop size and a slower speed generally more beneficial for running the given print job on the printer 10. Another example would be the user selecting a slow printer operation speed for a job that is classified as a low quality job. The PSRE 200 would in this case recommend running the job on the printer 10 at a higher speed. Again, in either of the foregoing examples, the operator may have the option to accept or reject the recommendations made by the PSRE 200.

In some suitable embodiments, the above described PSRE 200 may be implemented in and/or at the printer 10, in and/or at the print server 12 or in and/or at the client device 20 or elsewhere, e.g., on a server and/or as a cloud-based service (e.g., using a Software as a Service (SaaS) model or the like) accessible via the network 22. Similarly, in some suitable embodiments, the above described classification engine 600 may be implemented in and/or at the printer 10, in and/or at the print server 12 or in and/or at the client device 20 or elsewhere, e.g., on a server and/or as a cloud-based service (e.g., using a SaaS model or the like) accessible via the network 22.

The above methods, system, platforms, modules, processes, algorithms, devices and/or apparatus have been described with respect to particular embodiments. It is to be appreciated, however, that certain modifications and/or alteration are also contemplated.

It is to be appreciated that in connection with the particular exemplary embodiment(s) presented herein certain structural and/or function features are described as being incorporated in defined elements and/or components. However, it is contemplated that these features may, to the same or similar benefit, also likewise be incorporated in other elements and/or components where appropriate. It is also to be appreciated that different aspects of the exemplary embodiments may be selectively employed as appropriate to achieve other alternate embodiments suited for desired applications, the other alternate embodiments thereby realizing the respective advantages of the aspects incorporated therein.

It is also to be appreciated that any one or more of the particular tasks, steps, processes, methods, functions, elements and/or components described herein (e.g., such as the printer 10, the print server 12, the client device 20, the PSRE 200 and/or the classification engine 600) may suitably be implemented via hardware, software, firmware or a combination thereof. In particular, various modules, components and/or elements (e.g., such as those previously mentioned) may be embodied by processors, electrical circuits, computers and/or other electronic data processing devices that are configured and/or otherwise provisioned to perform one or more of the tasks, steps, processes, methods and/or functions described herein. For example, a processor, computer, server or other electronic data processing device embodying a particular element may be provided, supplied and/or programmed with a suitable listing of code (e.g., such as source code, interpretive code, object code, directly executable code, and so forth) or other like instructions or software or firmware, such that when run and/or executed by the computer or other electronic data processing device one or more of the tasks, steps, processes, methods and/or functions described herein are completed or otherwise performed. Suitably, the listing of code or other like instructions or software or firmware is implemented as and/or recorded, stored, contained or included in and/or on a non-transitory computer and/or machine readable storage medium or media so as to be providable to and/or executable by the computer or other electronic data processing device. For example, suitable storage mediums and/or media can include but are not limited to: floppy disks, flexible disks, hard disks, magnetic tape, or any other magnetic storage medium or media, CD-ROM, DVD, optical disks, or any other optical medium or media, a RAM, a ROM, a PROM, an EPROM, a FLASH-EPROM, or other memory or chip or cartridge, or any other tangible medium or media from which a computer or machine or electronic data processing device can read and use. In essence, as used herein, non-transitory computer-readable and/or machine-readable mediums and/or media comprise all computer-readable and/or machine-readable mediums and/or media except for a transitory, propagating signal.

Optionally, any one or more of the particular tasks, steps, processes, methods, functions, elements and/or components described herein may be implemented on and/or embodiment in one or more general purpose computers, special purpose computer(s), a programmed microprocessor or microcontroller and peripheral integrated circuit elements, an ASIC or other integrated circuit, a digital signal processor, a hardwired electronic or logic circuit such as a discrete element circuit, a programmable logic device such as a PLD, PLA, FPGA, Graphical card CPU (GPU), or PAL, or the like. In general, any device, capable of implementing a finite state machine that is in turn capable of implementing the respective tasks, steps, processes, methods and/or functions described herein can be used.

Additionally, it is to be appreciated that certain elements described herein as incorporated together may under suitable circumstances be stand-alone elements or otherwise divided. Similarly, a plurality of particular functions described as being carried out by one particular element may be carried out by a plurality of distinct elements acting independently to carry out individual functions, or certain individual functions may be split-up and carried out by a plurality of distinct elements acting in concert. Alternately, some elements or components otherwise described and/or shown herein as distinct from one another may be physically or functionally combined where appropriate.

In short, the present specification has been set forth with reference to preferred embodiments. Obviously, modifications and alterations will occur to others upon reading and understanding the present specification. It is intended that all such modifications and alterations are included herein insofar as they come within the scope of the appended claims or the equivalents thereof. It will be appreciated that variants of the above-disclosed and other features and functions, or alternatives thereof, may be combined into many other different systems or applications. Various presently unforeseen or unanticipated alternatives, modifications, variations or improvements therein may be subsequently made by those skilled in the art, which are also intended to be encompassed by the following claims.

What is claimed is:

1. An apparatus that automatically generates a set of recommended printer settings for a print job submitted to a printer, said apparatus comprising:
    at least one processor which executes computer program code from at least one memory, wherein the at least one memory and the computer program code are configured, with the at least one processor, to cause the apparatus at least to:
        receive a submitted print job for a printer, said submitted print job including content to be printed by the printer and a set of user input printer settings for the printer;
        analyze the content to be printed by the printer;
        designate a classification for the submitted print job based on said analysis;
        obtain historical data from a knowledge database, said historical data being related to prior print jobs run on the printer and indicating printer settings used when running the prior print jobs on the printer; and
        output a set of recommended printer settings based at least in part on one or more of the received print job, the designated classification and the obtained historical data.

2. The apparatus of claim 1, wherein the output set of recommended printer settings includes at least one of a recommended effective ink drop size to be used by the printer when running the submitted print job and a recommended print speed to be used by the printer when running the submitted print job.

3. The apparatus of claim 2, wherein the user input printer settings include at least one of a user selected effective ink drop size to be used by the printer when running the submitted print job, a user selected print speed to be used by the printer when running the submitted print job, a user selected media type on which the submitted print job is to be printed and a user selected classification for the submitted print job.

4. The apparatus of claim 3, wherein at least one of: the recommended effective ink drop size is different from the user selected effective ink drop size; the recommended print speed is different from the user selected print speed; and the designated classification is different from the user selected classification.

5. The apparatus of claim 4, wherein the at least one memory and the computer program code are configured, with the at least one processor, to cause the apparatus at least to:
provide a user with the option of running the submitted print job on the printer using one of the set of user input printer settings or the set of recommended printer settings.

6. The apparatus of claim 1, wherein the apparatus is incorporated in at least of one: the printer itself; a print server that receives submitted print jobs and queues them for the printer; and a client device that a user employs to submit the print job for the printer.

7. The apparatus of claim 1, wherein the printer is a digital ink-jet printer.

8. The apparatus of claim 1, wherein the at least one memory and the computer program code are configured, with the at least one processor, to further cause the apparatus at least to:
receive a set of printer system settings;
wherein the output set of recommended printer settings is further based at least in part on the received set of printer system settings.

9. The apparatus of claim 8, wherein the set of printer system settings includes at least one of: information about an amount of ink allowed per color; an average pixel count per page; and whether the printer is configured to print on one or two sides of an output media on which the print job is to be printed.

10. A method for setting up a printer to run a submitted print job thereon, said method comprising:
receiving a submitted print job for the printer, said submitted print job including content to be printed by the printer and a set of user input printer settings for the printer;
analyzing the content to be printed by the printer;
designating a classification for the submitted print job based on said analysis;
obtaining historical data from a knowledge database, said historical data being related to prior print jobs run on the printer and indicating printer settings used when running the prior print jobs on the printer; and
outputting a set of recommended printer settings based at least in part on one or more of the received print job, the designated classification and the obtained historical data.

11. The method of claim 10, wherein the output set of recommended printer settings includes at least one of a recommended effective ink drop size to be used by the printer when running the submitted print job and a recommended print speed to be used by the printer when running the submitted print job.

12. The method of claim 11, wherein the user input printer settings include at least one of a user selected effective ink drop size to be used by the printer when running the submitted print job, a user selected print speed to be used by the printer when running the submitted print job, a user selected media type on which the submitted print job is to be printed and a user selected classification for the submitted print job.

13. The method of claim 12, wherein at least one of: the recommended effective ink drop size is different from the user selected effective ink drop size; the recommended print speed is different from the user selected print speed; and the designated classification is different from the user selected classification.

14. The method of claim 13, further comprising:
providing a user with the option of running the submitted print job on the printer using one of the set of user input printer settings or the set of recommended printer settings.

15. The method of claim 10, wherein the method is performed by at least one of: the printer; a print server that receives submitted print jobs and queues them for the printer; and a client device that a user employs to submit the print job for the printer.

16. The method of claim 10, wherein the printer is a digital ink-jet printer.

17. The method of claim 10, further comprising:
receiving a set of printer system settings;
wherein the output set of recommended printer settings is further based at least in part on the received set of printer system settings.

18. The method of claim 17, wherein the set of printer system settings includes at least one of: information about an amount of ink allowed per color; an average pixel count per page; and whether the printer is configured to print on one or two sides of an output media on which the print job is to be printed.

19. The method of claim 10, wherein the output recommended printer settings are fed back to the knowledge database and stored therein to inform a recommendation for future submitted print jobs.

20. The method of claim 10, wherein the historical data is related to prior print jobs run on a fleet of printers including the printer and indicates printer settings used when running the prior print jobs thereon.

* * * * *